UNITED STATES PATENT OFFICE.

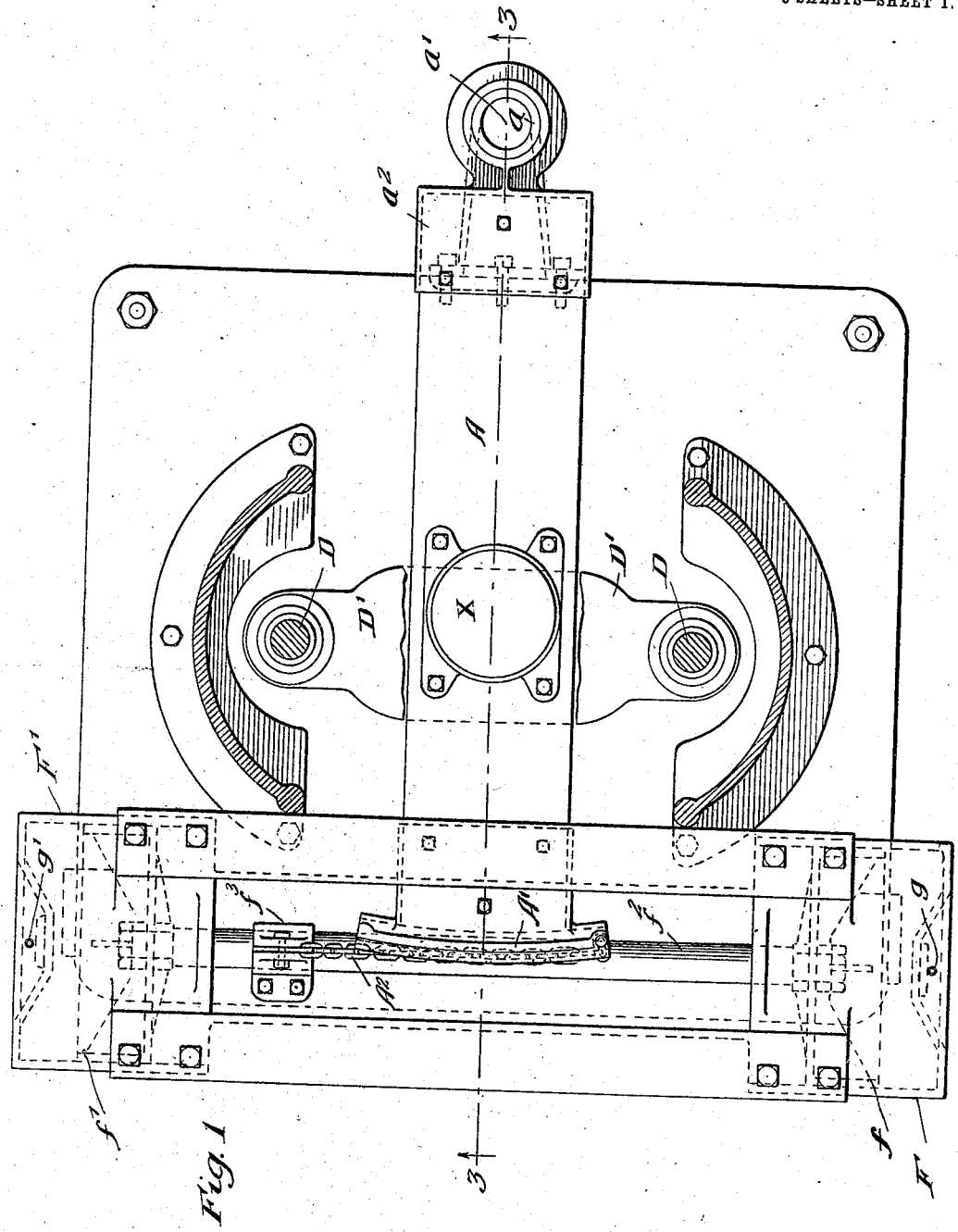

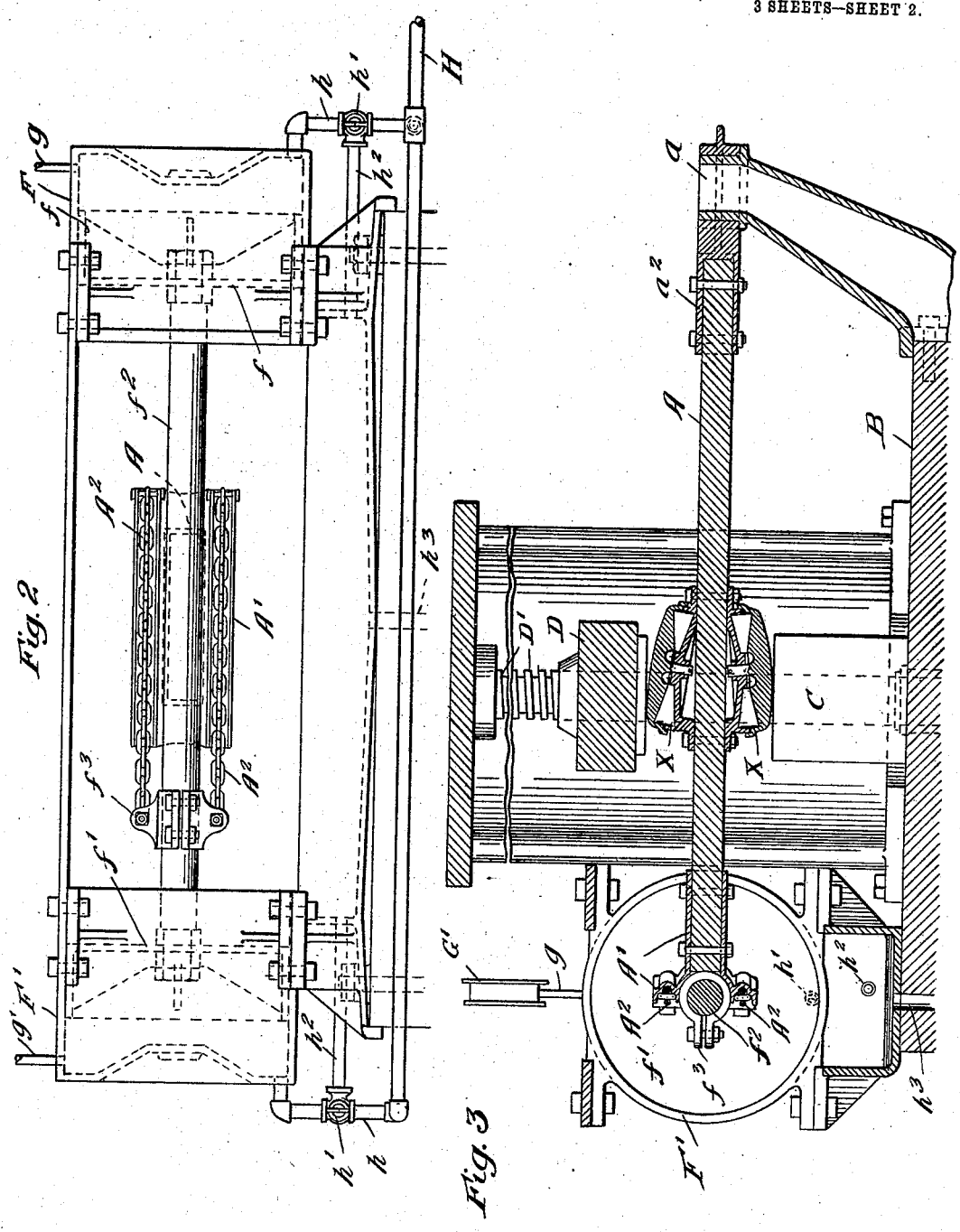

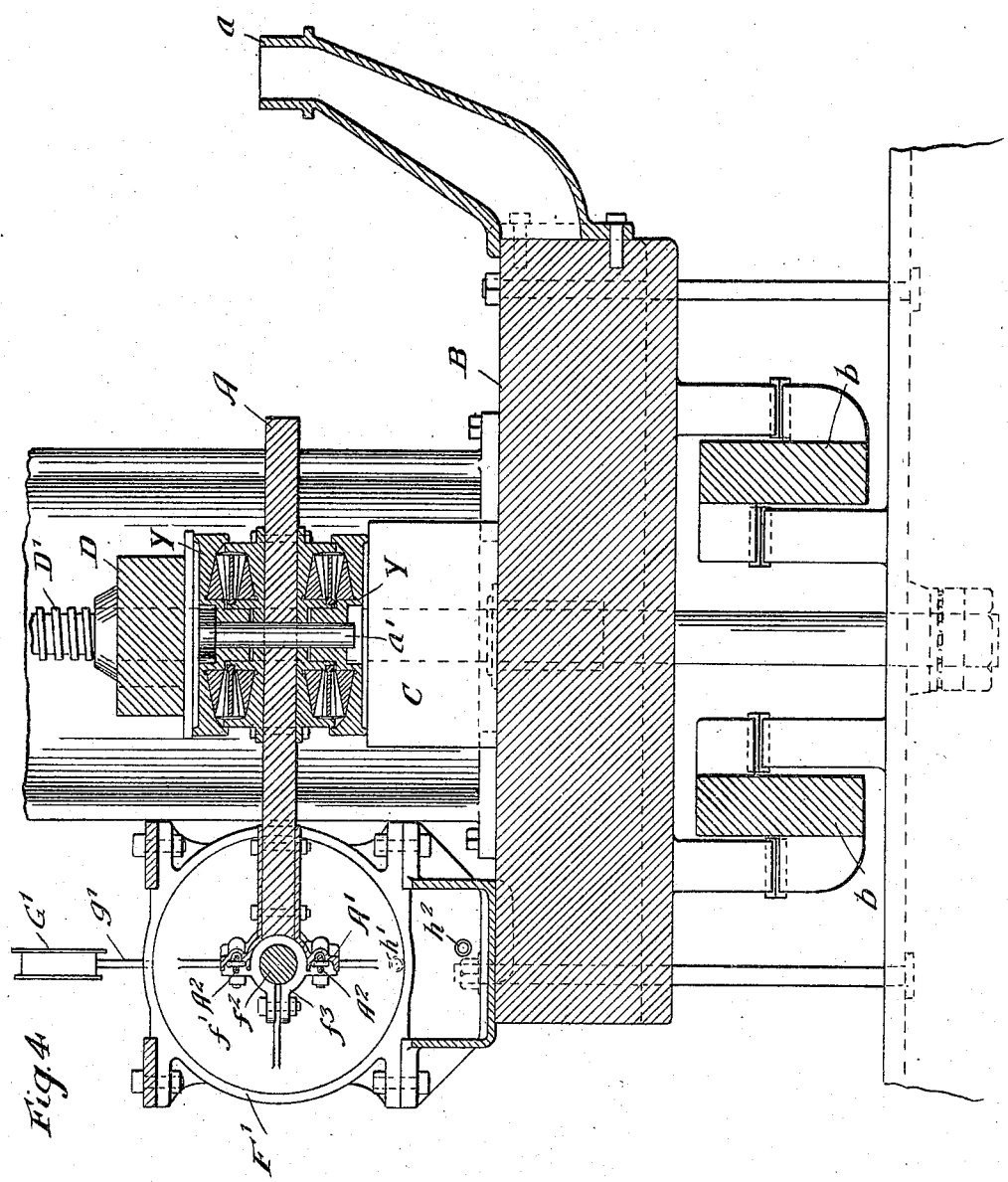

JOHN F. O'CONNOR, OF CHICAGO, ILLINOIS, ASSIGNOR TO W. H. MINER COMPANY, OF CHICAGO, ILLINOIS, A CORPORATION OF ILLINOIS.

RAILWAY-CAR SIDE-BEARING AND CENTER-BEARING TESTING MACHINE.

932,567.     Specification of Letters Patent.     Patented Aug. 31, 1909.

Application filed March 29, 1909. Serial No. 486,426.

*To all whom it may concern:*

Be it known that I, JOHN F. O'CONNOR, a citizen of the United States, residing in Chicago, in the county of Cook and State of Illinois, have invented a new and useful Improvement in Railway - Car Side - Bearing and Center-Bearing Testing Machines, of which the following is a specification.

My invention relates to improvements in machines for testing the operation of center bearings and side bearings of railway cars.

It consists in connection with an oscillating bar to which a pair of center plates or side bearings may be secured, one on each side thereof and adapted to oscillate horizontally like a car bolster, a load supporting head, a scale platform or load measuring device upon which said support is mounted, a load applying head for exerting pressure upon the center plates or side bearings carried by said oscillating bar, a pair of hydraulic cylinders, a pair of pistons reciprocating in said cylinders and having a common connecting stem, a pair of pressure indicating gages connected with said hydraulic cylinders and actuated thereby and a connection between said oscillating bar and the pistons of the hydraulic cylinders, said hydraulic cylinders having pipes connecting the same with a water supply under a fixed head or pressure and also with a water escape pipe so that when the escape from one of said cylinders is open, the water pressure in the other cylinder will oscillate the bar to one side and the difference of pressures indicated by the pressure gages connected with the two cylinders will show the amount of force required to be exerted at the end of the oscillating bar to overcome the frictional resistance of the center bearings or side bearings on the oscillating bar, and thus the operation and efficiency or lack of efficiency of their anti-friction devices.

The invention further consists in the novel construction of parts and devices and in the novel combinations of parts and devices herein shown and described.

In the accompanying drawing forming a part of this specification, Figure 1 is a plan view of a machine embodying my invention. Fig. 2 is a front elevation. Fig. 3 is a detail vertical section on line 3—3 of Fig. 1. Fig. 4 is a detail sectional view similar to Fig. 3, and illustrating the apparatus as used in testing railway car center bearings instead of for testing side bearings, as illustrated in Fig. 3.

In the drawing, A represents a horizontally oscillating bar, preferably of wood, and adapted to have secured on the opposite faces thereof a pair of roller or other side bearings X or a pair of center bearings Y, and mounted to oscillate about a pivot or trunnion $a$ or $a^1$ in the manner of a car bolster said bearings X or Y being secured to said bar by suitable bolts or clamps $a^2$. The oscillating anti-friction bearing holding bar A is provided with a segmental circularly curved head $A^1$, the curved face of which is struck about the center $a$ or $a^1$ about which the bar oscillates in testing side bearings or center bearings as the case may be; and this curved head is furnished with a flexible or chain connection $A^2$ for connecting the bar with the stem of the hydraulic cylinder pistons.

The load support C, consisting preferably of a block, rests upon the platform B of a scale or other load measuring device, the platform being connected through suitable knife-edge levers and links $b$ $b^1$ with a suitable scale beam or other device for indicating the amount of load or pressure exerted on the side bearings or center bearings carried by the bar A during the testing operation.

The load applying head D is preferably operated by a pair of screws $D^1$ mounted in the stationary frame of the machine, so that by turning these screws any desired amount of load or pressure may be applied to the side bearings or center bearings to be tested.

F $F^1$ are a pair of hydraulic cylinders in communication through pipes $g$ $g^1$ with a pair of pressure indicating gages G $G^1$. The pistons $f$ $f^1$ of these hydraulic cylinders are connected together by a stem $f^2$ which is furnished with a clamp or coupling $f^3$, and connects through the chain $A^2$ and curved head $A^1$ with the oscillating bar A which carries the side bearings or center bearings to be tested.

The hydraulic cylinders F $F^1$ are connected with a water supply pipe H by a suitable connecting pipe $h$, each furnished with a three-way cock or valve $h^1$ communicating with the water supply H and with a branch outlet or escape pipe $h^2$ which leads to the waste pipe $h^3$. The hydraulic cylinders F $F^1$ and the trunnion $a$ of the bar A are preferably mounted upon the scale platform B, thus eliminating any error that might add to the slight movement of the scale platform in respect to said trunnion $a$ or hydraulic cylinders F F$^1$. In operation, a pair of side bearings, as shown for example in Fig. 3, being secured on the opposite faces of the oscillating bar A and a suitable load or pressure being exerted thereupon by the screws D$^1$ to represent the weight of a car, and the three-way cock $h^1$ at the left of Fig. 2 being opened so that the water in the left hydraulic cylinder F may slowly escape through the escape pipe $h^2$, the right hand hydraulic cylinder and piston under the head or pressure of water from the supply pipe H will force the pistons to the left, and then the operator by noticing the difference of pressures indicated by the two pressure gages G G$^1$ connected respectively with the two hydraulic cylinders F F$^1$, can determine the amount of force required at the end of the bar A to overcome the frictional resistance of the side bearings on the upper and lower faces of the oscillating bar A. After the test has been completed, the pressure of the head D on the side bearings is relieved, and the left hand cock turned to open the communication between the supply H and the left hand cylinder, thus returning the pistons to position for a further operation.

The operation is the same in testing a pair of center bearings Y Y, the same being secured on opposite sides of a similar bar which oscillates about a pin $a^1$ extending through the center plates of the center bearings, and which in this instance, represents the king bolt of the car bolster.

I claim:—

1. A machine for testing the operation of center bearings or side bearings of railway cars, comprising in combination, a bearing carrying bar adapted to oscillate horizontally like a car bolster, a load support, a scale platform upon which the said support is mounted, a load applying head for exerting pressure upon the bearings carried by said bar, a pair of hydraulic cylinders, a pair of pistons reciprocating in said cylinders and having a stem connected with said oscillating bar, a pair of pressure indicating gages connected with said hydraulic cylinders and actuated thereby, the difference of pressure in said cylinders shown by said gages indicating the amount of force required to overcome the frictional resistance of the bearings carried by said bar, substantially as specified.

2. A machine for testing the operation of center bearings or side bearings of railway cars, comprising in combination, a bearing carrying bar adapted to oscillate horizontally like a car bolster, a load support, a scale platform upon which the said support is mounted, a load applying head for exerting pressure upon the bearings carried by said bar, a pair of hydraulic cylinders, a pair of pistons reciprocating in said cylinders and having a stem connected with said oscillating bar, a pair of pressure indicating gages connected with said hydraulic cylinders and actuated thereby, the difference of pressure in said cylinders shown by said gages indicating the amount of force required to overcome the frictional resistance of the bearings carried by said bar, said bar having a segmental curved head and a flexible connection with said piston stem, substantially as specified.

3. A machine for testing the operation of center bearings or side bearings of railway cars, comprising in combination, a bearing carrying bar adapted to oscillate horizontally like a car bolster, a load support, a scale platform upon which the said support is mounted, a load applying head for exerting pressure upon the bearings carried by said bar, a pair of hydraulic cylinders, a pair of pistons reciprocating in said cylinders and having a stem connected with said oscillating bar, a pair of pressure indicating gages connected with said hydraulic cylinders and actuated thereby, the difference of pressure in said cylinders shown by said gages indicating the amount of force required to overcome the frictional resistance of the bearings carried by said bar, a water supply under pressure communicating with said cylinders, escape pipes from said cylinders and valves controlling the communication of said water supply and escape pipes with said cylinders, substantially as specified.

4. A machine for testing the operation of center bearings or side bearings of railway cars, comprising in combination, a bearing carrying bar adapted to oscillate horizontally like a car bolster, a load support, a scale platform upon which the said support is mounted, a load applying head for exerting pressure upon the bearings carried by said bar, a pair of hydraulic cylinders, a pair of pistons reciprocating in said cylinders and having a stem connected with said oscillating bar, a pair of pressure indicating gages connected with said hydraulic cylinders and actuated thereby, the difference of pressure in said cylinders shown by said gages indicating the amount of force required to overcome the frictional resistance of the bearings carried by said bar, said bar having a segmental curved head and a flexible connection with said piston stem, a water supply under pressure communicating with said cylinders, escape pipes from said cylinders and valves controlling the communication of said water supply and escape pipes with said cylinders, substantially as specified.

5. A machine for testing the operation of center bearings or side bearings of railway cars, comprising in combination, a bearing carrying bar adapted to oscillate horizontally like a car bolster, a load support, a scale platform upon which the said support is mounted, a load applying head for exerting pressure upon the bearings carried by said bar, a pair of hydraulic cylinders, a pair of pistons reciprocating in said cylinders and having a stem connected with said oscillating bar, a pair of pressure indicating gages connected with said hydraulic cylinders and actuated thereby, the difference of pressure in said cylinders shown by said gages indicating the amount of force required to overcome the frictional resistance of the bearings carried by said bar, said hydraulic cylinders being mounted on the scale platform, substantially as specified.

6. A machine for testing the operation of center bearings or side bearings of railway cars, comprising in combination, a bearing carrying bar adapted to oscillate horizontally like a car bolster, a trunnion about which said bar oscillates a load support, a scale platform upon which the said support is mounted, a load applying head for exerting pressure upon the bearings carried by said bar, a pair of hydraulic cylinders, a pair of pistons reciprocating in said cylinders and having a stem connected with said oscillating bar, a pair of pressure indicating gages connected with said hydraulic cylinders and actuated thereby, the difference of pressure in said cylinders shown by said gages indicating the amount of force required to overcome the frictional resistance of the bearings carried by said bar, said hydraulic cylinders being mounted on the scale platform, and the trunnion about which said bar oscillates being also on the scale platform, substantially as specified.

7. A side bearing testing machine, comprising in combination a load support, a scale platform carrying said load support, a load applying head, a horizontally oscillating bar adapted to receive a pair of side bearings, one on each face thereof, a trunnion about which said bar oscillates carried by said scale platform, a pair of hydraulic cylinders and pistons and a pair of pressure gages, substantially as specified.

8. A side bearing testing machine, comprising in combination a load support, a scale platform carrying said load support, a load applying head, a horizontally oscillating bar adapted to receive a pair of side bearings, one on each face thereof, a trunnion about which said bar oscillates carried by said scale platform, a pair of hydraulic cylinders and pistons and a pair of pressure gages, said bar having a curved head and a flexible connection between said bar and said pistons, substantially as specified.

JOHN F. O'CONNOR.

Witnesses:
PEARL ABRAMS,
H. M. MUNDAY.